United States Patent
Choi et al.

(10) Patent No.: US 9,876,376 B2
(45) Date of Patent: Jan. 23, 2018

(54) MULTIPLE BATTERY CHARGER AND METHOD FOR CONTROLLING THE SAME

(71) Applicant: Foundation of Soongsil University-Industry Cooperation, Seoul (KR)

(72) Inventors: Woojin Choi, Seoul (KR); Long Tran Van, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 176 days.

(21) Appl. No.: 14/767,571

(22) PCT Filed: Aug. 14, 2014

(86) PCT No.: PCT/KR2014/007599
§ 371 (c)(1),
(2) Date: Aug. 12, 2015

(87) PCT Pub. No.: WO2015/072652
PCT Pub. Date: May 21, 2015

(65) Prior Publication Data
US 2015/0372513 A1    Dec. 24, 2015

(30) Foreign Application Priority Data
Nov. 14, 2013    (KR) .......................... 10-2013-0138061

(51) Int. Cl.
*H02J 7/00*    (2006.01)
*H02J 7/04*    (2006.01)
(Continued)

(52) U.S. Cl.
CPC ............ *H02J 7/007* (2013.01); *H02J 7/0003* (2013.01); *H02J 7/0013* (2013.01);
(Continued)

(58) Field of Classification Search
CPC .. H02J 7/022; H02J 7/02; H02J 7/0003; H02J 7/0013
(Continued)

(56) References Cited

U.S. PATENT DOCUMENTS 5,539,297 A * 7/1996 Fiebig .................. H02J 7/0024
320/126
5,658,319 A * 8/1997 Kroll .................... A61N 1/3956
607/5

(Continued)

FOREIGN PATENT DOCUMENTS

| CN | 1309436 A | 8/2001 |
|---|---|---|
| CN | 1525632 A | 9/2004 |

(Continued)

*Primary Examiner* — Samuel Berhanu
*Assistant Examiner* — Tarikh Rankine
(74) *Attorney, Agent, or Firm* — Novick, Kim & Lee, PLLC; Sang Ho Lee (57) ABSTRACT

A multiple battery charger is provided. The multiple battery charger includes an input unit configured to receive or block power from a power supply unit, an output unit including a plurality of output terminals, wherein the plurality of output terminals are commonly connected to the input unit and charge a plurality of batteries, and wherein each of the plurality of output terminals includes at least one of a plurality of second switches for a selective receipt of the power from the input unit and the plurality of output terminals are controlled in a time division multiple control manner, and a switching control unit configured to transmit a pulse width modulation signal to the input unit and the output unit so as to independently control the power applied to the plurality of batteries. Accordingly, a plurality of different kinds of batteries and the same kind of batteries in which charge states are different can be simultaneously charged.

10 Claims, 6 Drawing Sheets

(51) Int. Cl.
*H01M 10/44* (2006.01)
*H02J 7/02* (2016.01)

(52) U.S. Cl.
CPC .......... *H02J 7/0021* (2013.01); *H02J 7/0052* (2013.01); *H02J 7/0081* (2013.01); *H02J 7/0083* (2013.01); *H02J 7/02* (2013.01); *H02J 7/04* (2013.01); *H02J 7/0022* (2013.01); *H02J 7/045* (2013.01)

(58) Field of Classification Search
USPC .......................................................... 320/107
See application file for complete search history.

(56) References Cited

U.S. PATENT DOCUMENTS

| | | | |
|---|---|---|---|
| 5,764,030 A | | 6/1998 | Gaza |
| 8,222,866 B2 * | | 7/2012 | Sugimoto ............... B60K 6/445 180/65.1 |
| 2001/0010456 A1 * | | 8/2001 | Kaite ................... H02J 7/0019 320/125 |
| 2004/0113585 A1 * | | 6/2004 | Stanesti ............... H02J 7/0018 320/116 |
| 2005/0007797 A1 * | | 1/2005 | Zocchi ................. H02M 7/483 363/65 |
| 2007/0121350 A1 | | 5/2007 | Duvnjak |
| 2008/0143292 A1 * | | 6/2008 | Ward ..................... B60L 8/003 320/101 |
| 2008/0174276 A1 * | | 7/2008 | Takahashi ............... H02J 9/061 320/128 |
| 2008/0231115 A1 | | 9/2008 | Cho et al. |
| 2008/0238393 A1 * | | 10/2008 | Potter ...................... G06F 1/26 323/283 |
| 2010/0237830 A1 * | | 9/2010 | Castelaz ............... H02J 7/0019 320/118 |
| 2011/0025236 A1 * | | 2/2011 | Takizawa ................ H02M 1/32 318/139 |
| 2013/0088201 A1 * | | 4/2013 | Iwasawa ............ G01R 31/3679 320/118 |

FOREIGN PATENT DOCUMENTS

| | | |
|---|---|---|
| CN | 103095138 A | 5/2013 |
| EP | 0164144 B1 | 12/1985 |
| GB | 2292845 A | 3/1996 |
| JP | 11-285161 A | 10/1999 |
| JP | 2000-277167 A | 10/2000 |
| JP | 3416517 B2 | 6/2003 |
| JP | 2004-364388 A | 12/2004 |
| KR | 10-2009-0076330 | 7/2009 |
| KR | 2010-0005898 | 1/2010 |
| KR | 10-2010-0027018 | 3/2010 |

* cited by examiner

Mode 1

FIG. 5A

Mode 2

FIG. 5B

Mode 3

FIG.5C

Mode 4

MULTIPLE BATTERY CHARGER AND METHOD FOR CONTROLLING THE SAME

BACKGROUND

The following description relates to a multiple battery charger which can simultaneously charge a plurality of different kinds of batteries or the same kind of batteries in which charge states are different, and a method of controlling the same.

Recently, demand for mobile devices such as a smart phone, and a tablet personal computer (PC) is greatly growing in an electronic device market. With this growth, demand of consumers with respect to the high-performance mobile devices is continuously increasing, and demand of a market with respect to a high-performance battery having a great influence on performance and an operating time of the mobile devices is also increasing. Further, a kind of battery used in the high-performance mobile device is various, and studies on a multiple battery charger which can charge various kinds of batteries are being carried out.

The multiple battery charger is a device which can charge various kinds of batteries. Conventionally, when charging a plurality of batteries, it takes a long time for charging because while charging one of the batteries, the charger does not charge the rest of the batteries. Otherwise, while charging the plurality of batteries simultaneously, there is a problem in which various kinds of batteries are not simultaneously charged since the charger charges only the same kind of batteries with power having the same magnitude.

The present invention is directed to providing a multiple battery charger which can simultaneously charge a plurality of batteries using a time division multiple control method, and a method of controlling the same.

SUMMARY OF THE DISCLOSURE

One aspect of the present invention provides a multiple battery charger, including: an input unit configured to supply or block power from a power supply unit; an output unit including a plurality of output terminals which are commonly connected to the input unit and in which a plurality of batteries are charged, each of the plurality of output terminals including a second switch so as to selectively input the power and the plurality of output terminals controlled by a time division multiple control method; and a switching control unit configured to transmit a pulse width modulation signal to the input unit and the output unit so as to independently control the power applied to the plurality of batteries.

The multiple battery charger may further include: a feedback circuit unit configured to detect voltages of the plurality of output terminals and transmit the detected voltages to the switching control unit so as to independently perform a feedback control on the plurality of output terminals included in the output unit.

The input unit may include at least one first switch, and when power information on the plurality of output terminals is received through the feedback circuit unit, the switching control unit independently may compensate for the power on a corresponding output terminal by controlling the first switch and the plurality of second switches by the time division multiple control method according to the power information.

The switching control unit may control by the time division multiple control method by synchronizing the first switch and the plurality of second switches at one sampling time.

The switching control unit may operate the first switch at a frequency fs, and when there are n second switches, operate each switch at a frequency fs/n and control every power of the output terminals connected to the plurality of second switches for one period.

When the number of the second switches is n, the switching control unit may sequentially control the second switches for each time period Ts, and independently control the second switch at a time nTs.

Another aspect of the present invention provides a multiple battery charger, including: an input unit including at least one first switch; a transformer unit configured to convert a magnitude of power applied through the input unit; and a plurality of output units including a plurality of independent output terminals which receive the power through the transformer unit and in which the applied power is output, wherein each of the plurality of output terminals includes a second switch which is individually driven, and a plurality of batteries are connected to the plurality of output terminals, the first switch and the second switch are controlled by a time division multiple control by applying a pulse width modulation (PWM) signal, and powers charged in the plurality of batteries are independently controlled for each of the plurality of output terminals.

The plurality of independent output terminals included in the output unit may be commonly connected through the transformer unit, and the output terminal which receives the power converted through the transformer unit may be determined by an operation of the second switch.

The multiple battery charger may further include: a feedback circuit unit configured to detect power of each of the plurality of output terminals so as to independently control magnitudes of powers charged in the plurality of batteries connected to the plurality of output terminals.

Still another aspect of the present invention provides a method of controlling a multiple battery charger including an input unit including at least one first switch, a transformer unit configured to convert a magnitude of power applied through the input unit, and a plurality of second switches which receive the power applied through the transformer unit and include a plurality of second switches installed in a plurality of output terminals in which the applied power is output, the method, including: sequentially constructing a closed circuit of the output terminal and the transformer unit by controlling the plurality of second switches by a time division multiple control method; and controlling in association with the first switch when controlling the plurality of second switches by the time division multiple control method so as to independently control power applied to a plurality of batteries connected to the plurality of output terminals and charged.

As described above, according to one aspect of the present invention, the plurality of different kinds of batteries and the same kind of batteries in which the charge states are different can be simultaneously charged.

DETAILED DESCRIPTION OF EXEMPLARY EMBODIMENTS

Hereinafter, a multiple battery charger and a method of controlling the same according to embodiments of the present invention will be described below in more detail with reference to the accompanying drawings. When adding reference numerals in elements of each drawing, if possible, a like reference numeral will be used for a like element even though the like element is shown in another drawing.

Figure 1:
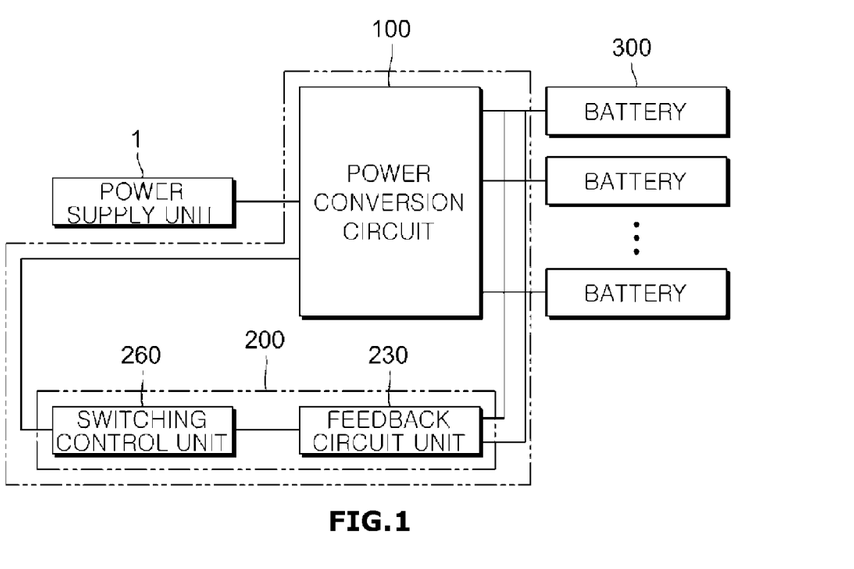
FIG. 1 is a block diagram illustrating a multiple battery charger according to an exemplary embodiment of the present invention.

FIG. 1 is a block diagram illustrating a multiple battery charger according to an exemplary embodiment of the present invention.

A multiple battery charger may include a power conversion circuit 100 configured to convert power supplied from a power supply unit 1 into powers having various magnitudes and provide the converted power to a battery 300, and a control circuit 200 configured to transmit a control signal to the power conversion circuit 100.

The power conversion circuit 100 may receive the power supplied from the power supply unit 1, convert the power into power suitable for a standard of the connected battery 300, and charge the battery 300. The power conversion circuit 100 may simultaneously provide various powers to a plurality of batteries 300 according to a time division multiple control method. The time division multiple control method may be used for the power conversion circuit, be a method of controlling powers applied to a plurality of output terminals connected to the battery 300 by time division, and will be described in detail hereinafter.

The control circuit 200 may include a feedback circuit unit 230 configured to detect the power output through the power conversion circuit 100 and generate feedback information, and a switching control unit 260 configured to transmit a control signal to the power conversion circuit 100 according to the generated feedback information.

The feedback circuit unit 230 may measure a voltage and a current supplied from the power conversion circuit 100 to the battery 300, and compare the voltage and the current with a reference signal, and generate the feedback information according to the compared result.

The switching control unit 260 may generate a switching control signal so as to control the power supplied to the battery 300 connected to the plurality of output terminals according to the feedback information.

Figure 2:
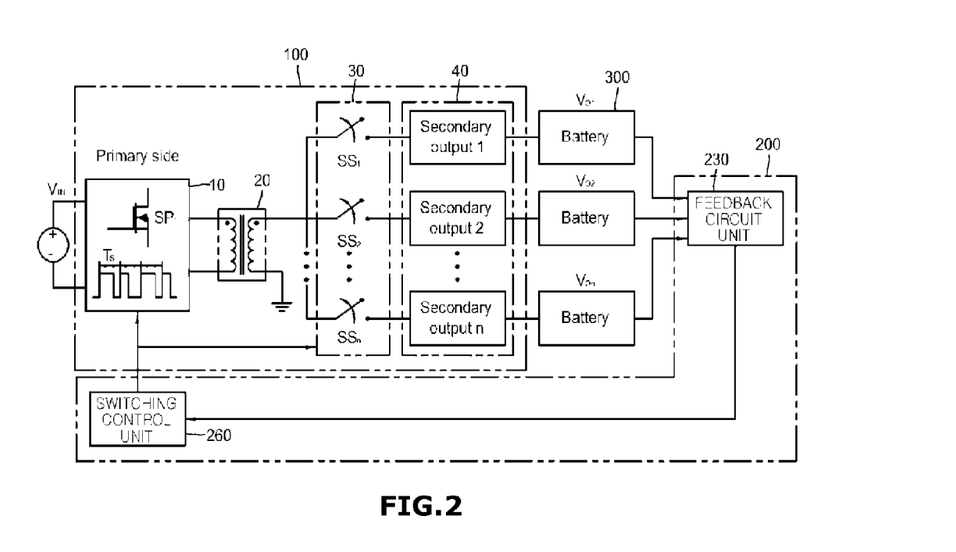
FIG. 2 is a circuit diagram illustrating a circuit operation of the multiple battery charger shown in FIG. 1.
Figure 3:
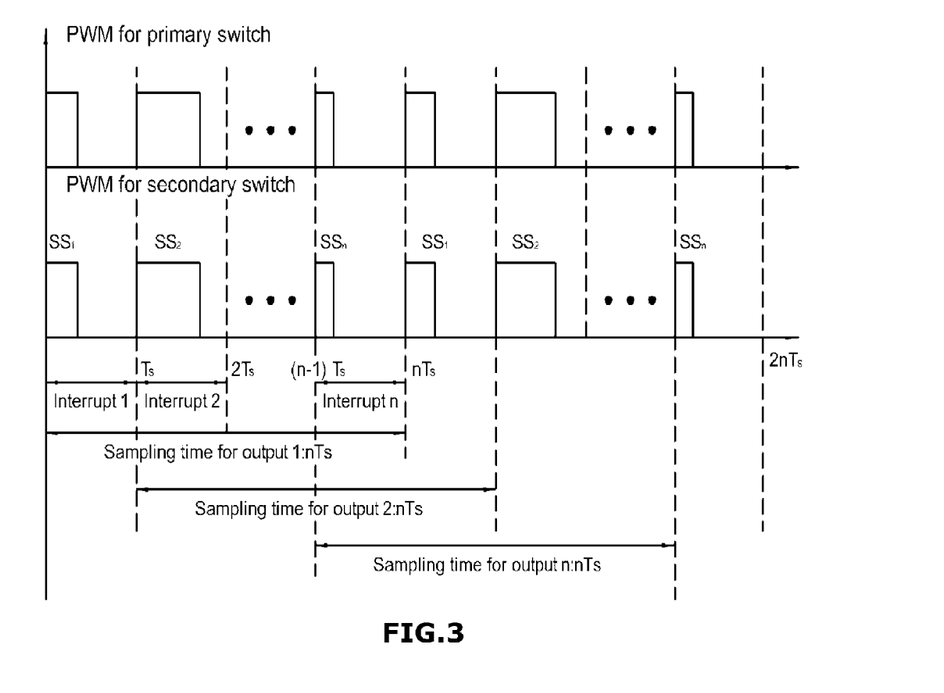
FIG. 3 is a diagram illustrating an example of a pulse width modulation signal which is applied to a multiple battery charger according to an exemplary embodiment of the present invention.

FIG. 2 is a circuit diagram illustrating a circuit operation of the multiple battery charger shown in FIG. 1, and FIG. 3 is a diagram illustrating an example of a pulse width modulation signal which is applied to a multiple battery charger according to an exemplary embodiment of the present invention.

Referring to FIG. 2, the power conversion circuit may include an input unit 10, a transformer unit 20, a second switch unit 30, and an output unit 40.

The input unit 10 may include a first switch $SP_1$, and at least one first switch $SP_1$ may be provided. The input unit 10 may receive power through input direct current power, receive a pulse width modulation (PWM) signal from the control circuit 200, and transmit the input direct current power to the transformer unit 20 according to the PWM signal.

The transformer unit 20 may convert the input power (increase or decrease the voltage) and output the converted power, and include a first coil and a second coil in which a turns ratio is n:1.

The second switch unit 30 may include a plurality of second switches $SS_1, SS_2, \ldots, SS_n$ so as to switch the input power applied through the transformer unit 20 and transmit the switched input power to the output unit 40. The plurality of second switches $SS_1, SS_2, \ldots, SS_n$ of the second switch unit 30 may be turned on or off by the time division multiple control method according to the control signal applied through the control circuit 200.

The output unit 40 may include a plurality of output terminals output 1, Second output 2, . . . , Second output n, and the plurality of output terminals may be connected to the plurality of second switches $SS_1, SS_2, \ldots, SS_n$ which are provided in the second switch unit 30, respectively, and receive charged power by the time division multiple control method.

A plurality of different kinds of batteries 300 or a plurality of batteries 300 in which charge states are different may be connected to the plurality of output terminals Second output 1, Second output 2, . . . , Second output n of the output unit 40, and power reflecting the feedback information may be supplied to the connected batteries 300.

As described above, the control circuit 200 may include the feedback circuit unit 230, and the switching control unit 260.

The feedback circuit unit 230 may detect the voltage and the current output from the plurality of output terminals of the power conversion circuit 100, generate the feedback information, and provide the generated feedback information to the switching control unit 260. The feedback circuit unit 230 may transmit the voltage and the current output from the plurality of output terminals to the switching control unit 260, and control the charged power of each of the plurality of output terminals Second output 1, Second output 2, . . . , Second output n of the output unit 40.

The switching control unit 260 may transmit a switching signal to the input unit 10 and the second switch unit 30 of the power conversion circuit 100, and control a switching operation of each of the input unit 10 and the second switch unit 30.

The switching control unit 260 may control the input unit 10 and the second switch unit 30 by the time division multiple control method. According to the time division multiple control method, the switching control unit 260 may perform a PWM control on the first switch $SP_1$ included in the input unit 10 at a frequency fs, and perform the PWM control on each of n switches included in the second switch unit 30 at a frequency fs/n. According to the time division multiple control method, voltages on every output terminal connected to the second switch unit 30 may be controlled during N time period nTs, and each of the plurality of output terminals included in the output unit 40 may be independently controlled during one switching period Ts. Further, each switch included in the second switch unit 30 may be sequentially turned on by being synchronized with the PWM control of the first switch $SP_1$ during one individual switching period. Accordingly, every output terminal of the output unit 40 may be individually controlled in one sampling period.

Referring to FIG. 3, when n switches are included in the second switch unit 30, the switching control unit 260 may perform the PWM control on the first switch $SP_1$ during a N time period nTs, and control every second switch $SS_1$, $SS_2$, ..., $SS_n$ included in the second switch unit 30 for the N time period nTs by sequentially turning on the second switches $SS_1$, $SS_2$, ..., $SS_n$ included in the second switch unit 30 for each time Ts, and thus the charged power of every output terminal Second output 1, Second output 2, ..., Second output n connected to each of the second switches $SS_1$, $SS_2$, ..., $SS_n$ included in the second switch unit 30 may be individually controlled.

Figure 4:
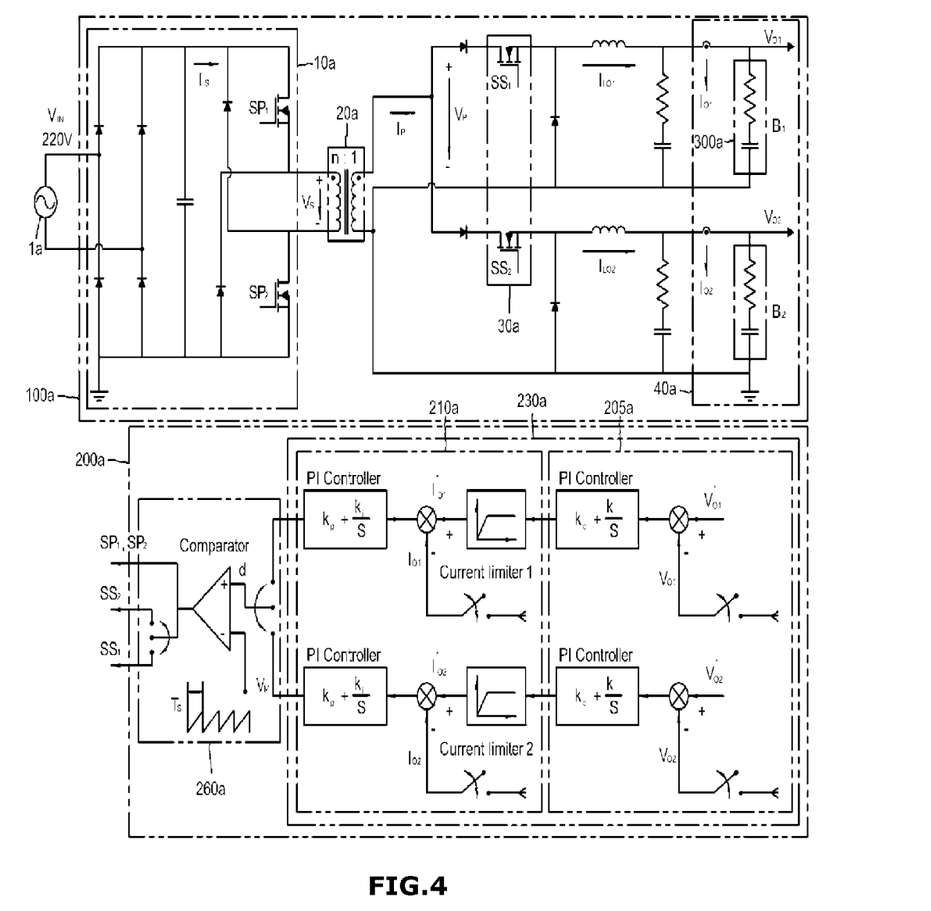
FIG. 4 is a circuit diagram of a multiple battery charger according to an exemplary embodiment of the present invention.
Figure 5A:
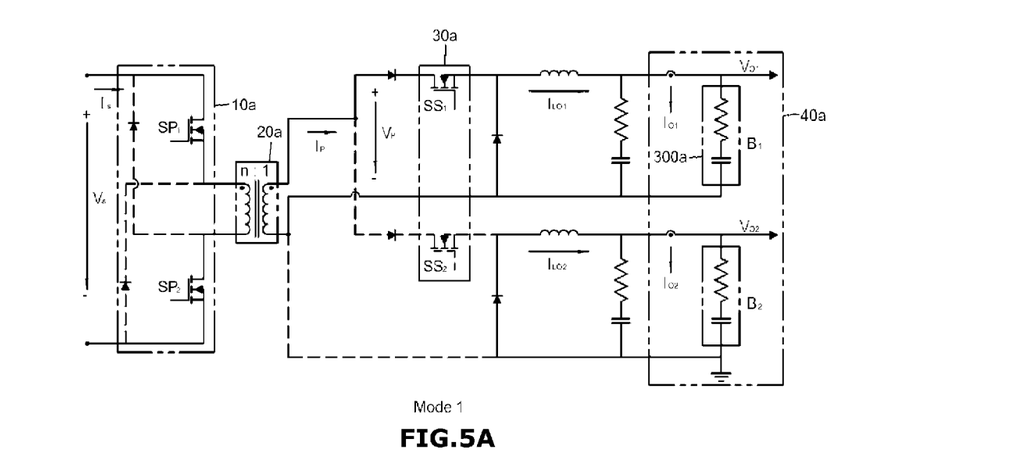
FIGS. 5A to 5D are diagrams illustrating an operation mode of the multiple battery charger shown in FIG. 4.
Figure 5B:
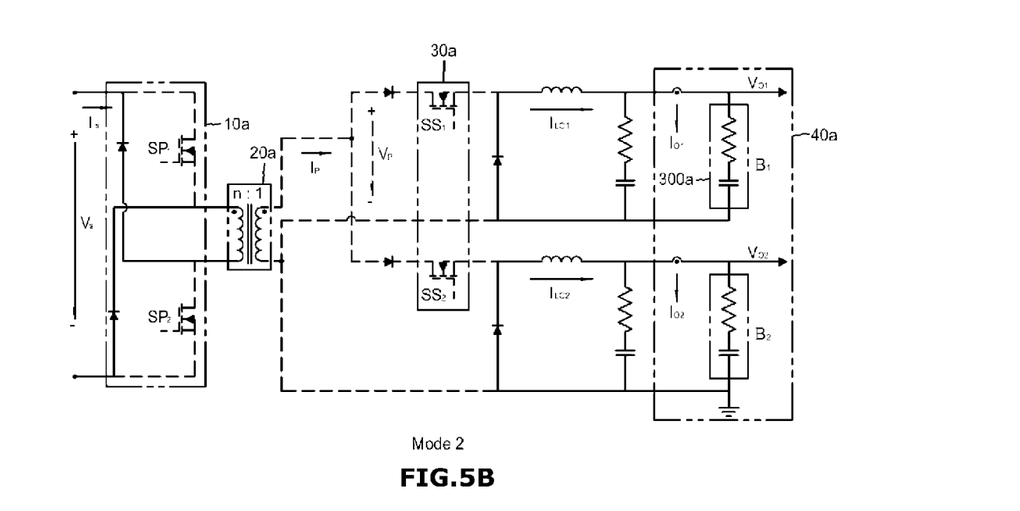
Figure 5C:
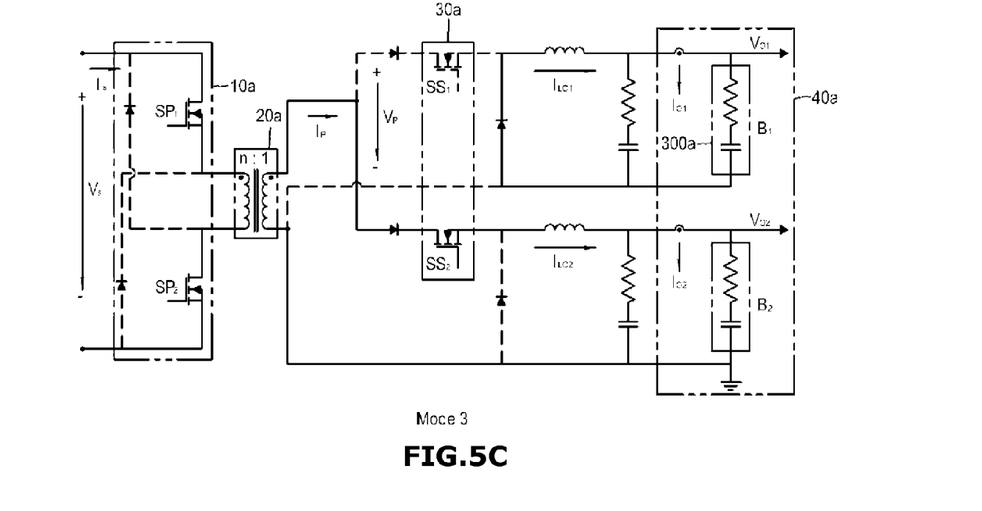
Figure 5D:
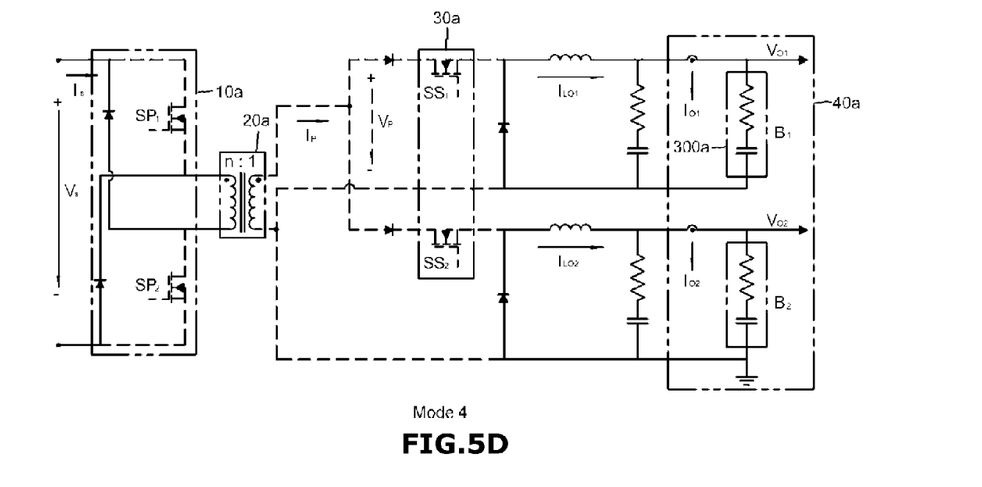
Figure 6:
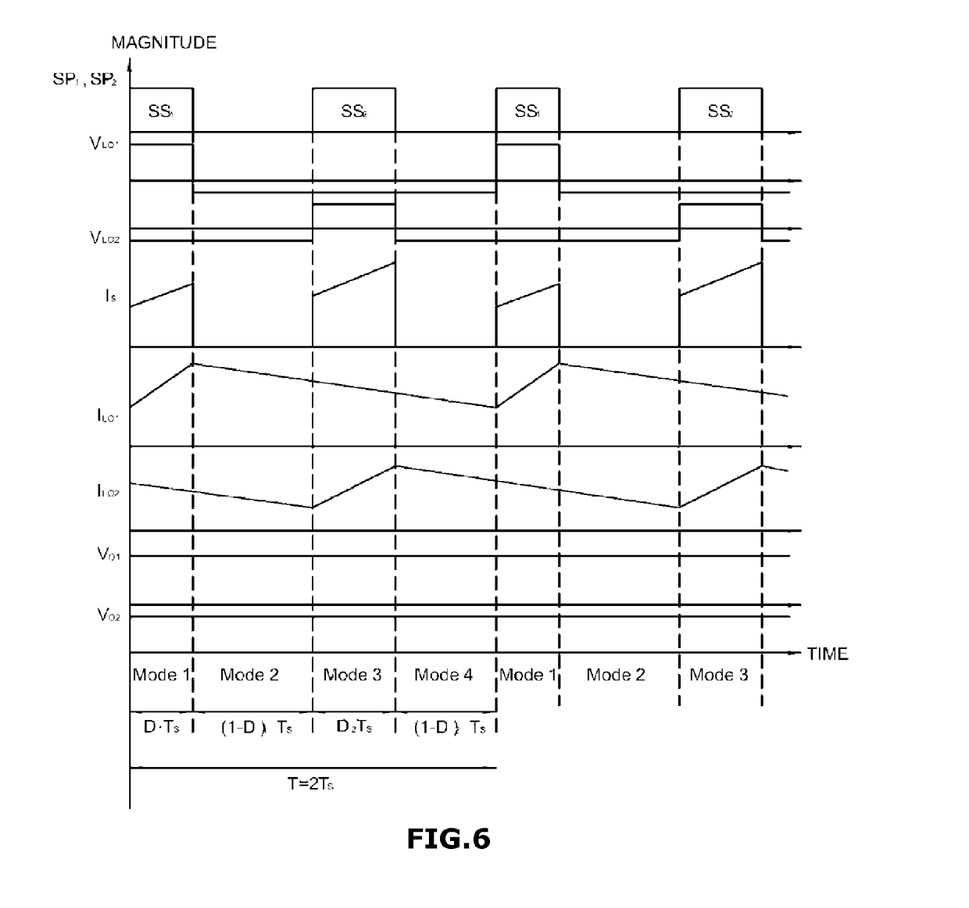
FIG. 6 is a graph illustrating a signal change of the multiple battery charger shown in FIG. 4.

FIG. 4 is a circuit diagram of a multiple battery charger according to an exemplary embodiment of the present invention, FIGS. 5A to 5D are diagrams illustrating an operation mode of the multiple battery charger shown in FIG. 4, and FIG. 6 is a graph illustrating a signal change of the multiple battery charger shown in FIG. 4.

FIG. 4 is a circuit diagram illustrating an example in which the output unit 40 of the multiple battery charger shown in FIG. 2 has a double-ended type, and an embodiment of the present invention is not limited to the multiple battery charger having the double-ended type.

The multiple battery charger may include a power conversion circuit 100a and a control circuit 200a.

The power conversion circuit 100a may include an input unit 10a, a transformer unit 20a, a second switch unit 30a, and an output unit 40a.

The input unit 10a may include first switches $SP_1$ and $SP_2$, and the first switches $SP_1$ and $SP_2$ may include two switches. The input unit 10a may input power through input direct current power, switch the input direct current power input by receiving a PWM signal from the control circuit 200a, and transmit it to the transformer unit 20a.

The transformer unit 20a may output boosted power by boosting the input power, and include a first coil and a second coil in which a turns ratio is n:1.

The second switch unit 30a may include two second switches $SS_1$ and $SS_2$ so as to switch the input power applied through the transformer unit 20a and transmit it to the output unit 40a. Two second switches $SS_1$ and $SS_2$ in the second switch unit 30a may be controlled by a time division multiple control method according to a control signal applied through the control circuit 200a.

The output unit 40a may include two output terminals, and the two output terminals may be connected to the second switches $SS_1$ and $SS_2$ provided in the second switch unit 30a, respectively, and receive the output voltage by the time division multiple control method.

The control circuit 200a may include a feedback circuit unit 230a and a switching control unit 260a.

The feedback circuit unit 230a may include a voltage control unit 205a and a current control unit 210a.

The voltage control unit 205a may detect a voltage $V_{O1}$ output from two output terminals and detect an error between the detected voltage $V_{O1}$ and a reference voltage $V^*_{O1}$, and a PI controller may perform an operation of amplifying the error, and setting an amplification rate of the error, etc. according to the detected error and output a current for adjusting the error of the voltage.

The current control unit 210a may receive the current output from the voltage control unit 205a through current limiters Current limiter 1, Current limiter 2, filter as a magnitude in which a limit is set, and detect an error by comparing a reference current $I^*_{O1}$ output by being filtered and the detected current $I_{O1}$, and the PI controller may output a signal to a positive (+) terminal of a comparator so as to make a PWM signal according to the detected error.

According to the method described above, the feedback circuit unit 230a may calculate an error by comparing power (a voltage, a current) information output from two output terminals and reference information, and independently control the charged power of each output terminal of the output unit 40a by transmitting feedback information which should be reflected according to the error to the switching control unit 260a.

The switching control unit 260a may input a signal applied through the PI controller included in the current control unit 210a to the positive (+) terminal of the comparator, and generate the PWM signal by inputting a triangle wave to be compared to a terminal.

The switching control unit 260a may control a switching operation of the input unit 10a and the second switch unit 30a of the power conversion circuit 100a according to the generated PWM signal.

The switching control unit 260a may control the first switches $SP_1$, $SP_2$ of the input unit 10a and the second switches $SS_1$, $SS_2$ of the second switch unit 30a by the time division multiple control method.

Referring to FIGS. 5A to 5D, 6, the switching control unit 260a may control the first switches $SP_1$, $SP_2$ and the second switch unit 30a in the steps of mode 1 to mode 4.

Referring to FIGS. 5A and 6, the switching control unit 260a may turn on the first switches $SP_1$, $SP_2$ using the PWM control in the mode 1, and turn on an upper switch $SS_1$ of the second switch unit 30a and turn off a lower switch $SS_2$.

When the switching control unit 260a turns on the first switches $SP_1$, $SP_2$, input direct current power $V_S$ may be applied to the transformer unit 20a. The transformer unit 20a may convert the input direct current power according to the turns ratio. The power converted by the transformer unit 20a may be applied to a first battery $B_1$ through the upper switch $SS_1$, and increase a current $I_P$ output through the second unit of the transformer unit 20a for a period of the mode 1, and thus a magnitude of a current $I_{LO1}$ may be increased since the current $I_P$ output through the second unit flows to a first inductor $L_{O1}$ connected to the first battery $B_1$. A voltage $V_{LO1}$ may be generated in the first inductor $L_{O1}$ and an output voltage $V_{O1}$ may be generated in the first battery $B_1$ according to the current flowing through the first inductor $L_{O1}$.

Referring to FIGS. 5B and 6, the switching control unit 260a may turn off the first switches $SP_1$, $SP_2$ using the PWM control in the mode 2 period, and turn off both the upper switch $SS_1$ and the lower switch $SS_2$ of the second switch unit 30a.

Accordingly, currents which are previously stored in the inductors $L_{O1}$, $L_{O2}$ and capacitors $C_{O1}$, $C_{O2}$ may flow in the first battery $B_1$ and a second battery $B_2$, the current output through the transformer unit 20a may be 0, and the current flowing through the first inductor $L_{O1}$ and second inductor $L_{O2}$ may be decreased.

Referring to FIGS. 5C and 6, the switching control unit 260a may turn on the first switches $SP_1$, $SP_2$ using the PWM control in the mode 3, and turn off the upper switch $SS_1$ of the second switch unit 30a and turn on the lower switch $SS_2$.

When the switching control unit 260a turns on the first switches $SP_1$, $SP_2$, the input direct current power $V_S$ may be applied to the transformer unit 20a. The transformer unit 20a may convert the applied input direct current power $V_S$ according to a turns ratio. The power converted by the transformer unit 20a may be applied to the second battery $B_2$ through the lower switch $SS_2$, and the current $I_P$ output through the second unit of the transformer unit 20a may be increased during a period of the mode 3, and thus a magnitude of a current $I_{LO2}$ may be increased since the current $I_P$ output through the second unit flows to the second inductor $L_{O2}$ of the output unit 40a. An output voltage $V_{O2}$ may be generated in the second battery $B_2$.

Referring to FIGS. 5D and 6, the switching control unit 260a may turn off the first switches $SP_1$, $SP_2$ using the PWM control in the mode 4, and turn off both of the upper switch $SS_1$ and the lower switch $SS_2$ of the second switch unit 30a.

Accordingly, the currents which are previously stored in the inductors $L_{O1}$, $L_{O2}$, and the capacitors $C_{O1}$, $C_{O2}$ may flow in the first battery $B_1$ and the second battery $B_2$, the current output through the transformer 20a unit may be 0, and the current flowing through the first inductor $L_{O1}$ and the second inductor $L_{O2}$ may be decreased.

As described above, the first side of the converter included in the multiple battery charger may be shared, the plurality of output terminals may be provided in the second side, a charge of the battery 300 may be independently controlled by the time division multiple control method by installing a switch which can be individually controlled in each of the plurality of output terminals.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A multiple battery charger comprising:
   an input unit configured to receive or block power from a power supply unit;
   an output unit including a plurality of output terminals, wherein the plurality of output terminals are commonly connected to the input unit and charge a plurality of batteries, and wherein each of the plurality of output terminals includes at least one of a plurality of second switches for a selective receipt of the power from the input unit and the plurality of output terminals are controlled in a time division multiple control manner; and
   a switching control unit configured to transmit a pulse width modulation (PWM) signal to the input unit and the output unit so as to independently control the power applied to the plurality of batteries,
   wherein a first pulse of the PWM signal is simultaneously sent to the input unit and to an upper second switch in the output unit, and
   wherein a second pulse of the PWM signal is simultaneously sent to the input unit and to a lower second switch in the output unit,
   wherein the output unit comprises:
   a first upper rectifier connecting an upper output of a transformer to a left side of the upper second switch;
   a second upper rectifier connecting a right side of the upper second switch to a lower output of the transformer;
   an upper inductor connecting the right side of the upper second switch to an upper part of an upper resistor and to an upper part of an upper battery;
   an upper capacitor connecting a lower part of the upper resistor to the lower output of the transformer;
   a first lower rectifier connecting the upper output of the transformer to a left side of the lower second switch;
   a second lower rectifier connecting a right side of the lower second switch to the lower output of the transformer;
   a lower inductor connecting the right side of the lower second switch to an upper part of a lower resistor and to an upper part of a lower battery; and
   a lower capacitor connecting a lower part of the lower resistor to the lower output of the transformer.

2. The multiple battery charger of claim 1, wherein the multiple battery charger further comprises a feedback circuit unit configured to detect a level of voltages of the plurality of output terminals and transmit an information of the level of the voltages to the switching control unit for performing an independent feedback control on the plurality of output terminals in the output unit.

3. The multiple battery charger of claim 2, wherein the input unit includes at least one first switch, and upon receipt of the information of the level of the voltages from the feedback circuit unit, the switching control unit independently compensates for the power on a corresponding output terminal by controlling the at least one first switch and the plurality of second switches in the time division multiple control manner based on the information of the level of the voltages.

4. The multiple battery charger of claim 3, wherein the switching control unit is configured to synchronize the at least one first switch and the plurality of second switches over one sampling time for a time division multiple control.

5. The multiple battery charger of claim 3, wherein the switching control unit is configured to operate the at least one first switch at a frequency fs, and wherein each of the plurality of second switches, having N-number switches, is operated at a frequency fs/n so that the switching control unit controls all of the powers of the plurality of output terminals in the plurality of second switches over N-time period.

6. The multiple battery charger of claim 1, wherein the plurality of second switches has N-number switches and the switching control unit is configured to control each of the plurality of second switches in a sequential order over a time period Ts, and to independently control each and every one of the plurality of second switches over a N time period nTs.

7. A multiple battery charger comprising:
   an input unit having at least one first switch;
   a transformer unit configured to convert a magnitude of power received from the input unit; and
   an output unit having a plurality of output terminals which are configured to receive the power from the transformer unit,
   wherein each of the plurality of output terminals includes at least one of a plurality of second switches,
   wherein each of the plurality of second switches is separately operable, and
   wherein the plurality of output terminals are connected to a plurality of batteries, and
   wherein the first switch and the second switches are controlled by a time division multiple control by applying a pulse width modulation (PWM) signal so that powers charged to the plurality of batteries are independently controlled per each of the plurality of output terminals,
   wherein a first pulse of the PWM signal is simultaneously sent to the input unit and to an upper second switch in the output unit, and
   wherein a second pulse of the PWM signal is simultaneously sent to the input unit and to a lower second switch in the output unit, wherein the output unit comprises:
a first upper rectifier connecting an upper output of a transformer to a left side of the upper second switch;
a second upper rectifier connecting a right side of the upper second switch to a lower output of the transformer;
an upper inductor connecting the right side of the upper second switch to an upper part of an upper resistor and to an upper part of an upper battery;
an upper capacitor connecting a lower part of the upper resistor to the lower output of the transformer;
a first lower rectifier connecting the upper output of the transformer to a left side of the lower second switch;
a second lower rectifier connecting a right side of the lower second switch to the lower output of the transformer;
a lower inductor connecting the right side of the lower second switch to an upper part of a lower resistor and to an upper part of a lower battery; and
a lower capacitor connecting a lower part of the lower resistor to the lower output of the transformer.

8. The multiple battery charger of claim 7, wherein the plurality of output terminals in the output unit are jointly connected to the transformer unit, and an operation of the plurality of second switches determines at least one of the plurality of output terminals to receive the power from the transformer unit.

9. The multiple battery charger of claim 7, wherein the multiple battery charger further comprises a feedback circuit unit configured to detect a level of power of each of the plurality of output terminals for independently controlling magnitudes of powers charged in the plurality of batteries connected to the plurality of output terminals.

10. A method for controlling a multiple battery charger including an input unit including at least one first switch, a transformer unit configured to convert a magnitude of power from the input unit, and a plurality of second switches which receive the power from the transformer unit and include the plurality of second switches installed in a plurality of output terminals,
the method comprising:
sequentially constructing a closed circuit of the output terminal and the transformer unit by controlling the plurality of second switches in a time division multiple control manner; and
when controlling the plurality of second switches in the time division multiple control manner, performing an interlock control to the at least one first switch, for an independent power control to a plurality of batteries, which are connected to the plurality of output terminals,
wherein a first pulse of the PWM signal is simultaneously sent to the input unit and to an upper second switch in the output unit, and
wherein a second pulse of the PWM signal is simultaneously sent to the input unit and to a lower second switch in the output unit,
wherein the output unit comprises:
a first upper rectifier connecting an upper output of a transformer to a left side of the upper second switch;
a second upper rectifier connecting a right side of the upper second switch to a lower output of the transformer;
an upper inductor connecting the right side of the upper second switch to an upper part of an upper resistor and to an upper part of an upper battery;
an upper capacitor connecting a lower part of the upper resistor to the lower output of the transformer;
a first lower rectifier connecting the upper output of the transformer to a left side of the lower second switch;
a second lower rectifier connecting a right side of the lower second switch to the lower output of the transformer;
a lower inductor connecting the right side of the lower second switch to an upper part of a lower resistor and to an upper part of a lower battery; and
a lower capacitor connecting a lower part of the lower resistor to the lower output of the transformer.

* * * * *